US009336129B2

(12) United States Patent
Bennett et al.

(10) Patent No.: US 9,336,129 B2
(45) Date of Patent: May 10, 2016

(54) SYSTEM AND METHOD FOR BANK LOGICAL DATA REMAPPING

(71) Applicants: Alan Bennett, Edinburgh (GB); Sergey Anatolievich Gorobets, Edinburgh (GB)

(72) Inventors: Alan Bennett, Edinburgh (GB); Sergey Anatolievich Gorobets, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 290 days.

(21) Appl. No.: 14/044,548

(22) Filed: Oct. 2, 2013

(65) Prior Publication Data

US 2015/0095546 A1    Apr. 2, 2015

(51) Int. Cl.
*G06F 12/02* (2006.01)
*G06F 3/06* (2006.01)
*G06F 12/00* (2006.01)

(52) U.S. Cl.
CPC .............. *G06F 12/00* (2013.01); *G06F 3/0649* (2013.01); *G06F 12/0246* (2013.01); *G06F 12/0292* (2013.01)

(58) Field of Classification Search
CPC ..... G06F 3/0616; G06F 3/064; G06F 3/0649; G06F 3/0679; G06F 3/0688; G06F 12/0246; G06F 12/0292
See application file for complete search history.

(56) References Cited

U.S. PATENT DOCUMENTS

| 5,553,023 | A | 9/1996 | Lau et al. | |
|---|---|---|---|---|
| 6,081,447 | A * | 6/2000 | Lofgren | G06F 12/0246 365/185.02 |
| 6,401,177 | B1 | 6/2002 | Koike | |
| 2008/0313505 | A1 | 12/2008 | Lee et al. | |
| 2009/0287875 | A1 | 11/2009 | Lin | |
| 2010/0100663 | A1* | 4/2010 | Kao | G06F 12/0246 711/103 |
| 2010/0115175 | A9 | 5/2010 | Zhuang et al. | |
| 2011/0029583 | A1 | 2/2011 | Nakanishi | |
| 2011/0296120 | A1 | 12/2011 | Khan | |
| 2012/0066441 | A1 | 3/2012 | Weingarten | |
| 2013/0121075 | A1* | 5/2013 | Hutchison | G11C 11/5628 365/185.11 |

FOREIGN PATENT DOCUMENTS

| EP | 0 843 261 A2 | 5/1998 |
|---|---|---|
| WO | 2004/040584 A1 | 5/2004 |
| WO | 2010/078540 A2 | 7/2010 |
| WO | 2011/019602 A2 | 2/2011 |

OTHER PUBLICATIONS

Im, Soojun, et al., ComboFTL: Improving performance and lifespan of MLC flash memory using SLC flash buffer, Journal of Systems Architecture, Sep. 24, 2010 (14 pages).

Murugan, Muthukumar, et al., Rejuvenator: A Static Wear Leveling Algorithm for NAND Flash Memory with Minimized Overhead, IEEE, 2011 (12 pages).

* cited by examiner

*Primary Examiner* — Hal Schnee
(74) *Attorney, Agent, or Firm* — Brinks Gilson & Lione

(57) ABSTRACT

A method and system are disclosed for remapping logical addresses between memory banks of discrete or embedded multi-bank storage device. The method may include a controller of a storage device tracking a total erase count for a storage device, determining if an erase count imbalance greater than a threshold exists between banks, and then remapping logical address ranges from the highest erase count bank to the lowest erase count bank to even out wear between the banks. The system may include a controller that may maintain a bank routing table, an erase counting mechanism and execute instructions for triggering a remapping process to remap an amount of logical addresses such that an address range is reduced for a hotter bank and increased for a colder bank.

19 Claims, 7 Drawing Sheets

SYSTEM AND METHOD FOR BANK LOGICAL DATA REMAPPING

TECHNICAL FIELD

This application relates generally to a method and system for managing the storage of data in a multi-bank data storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "pages" that can be written, and groups of pages called "blocks" that can be read and erased, by a storage manager often residing in the memory system.

In non-volatile memory systems having multiple memory banks, there are regions of data which may be more active, and therefore the banks associated with those regions of data are more likely to wear out quickly. Typically, a multiple memory bank non-volatile memory includes separate die or dies for each bank, and a controller routes data associated with fixed slices of a logical block address space exclusively to each of the separate memory banks such that each bank only receives data associated with a predetermined range of the total logical address space. A problem can arise when a small hot spot develops. The hot spot may be a very active address range in the data where data is frequently written and erased. If this hot spot is located in a single bank, that particular bank becomes "hotter" than the rest, being subjected to more write and erase cycles and thus more likely to wear quickly. It is also possible that one bank of the multiple banks becomes hotter than the others due to host activity or grown defects (e.g., defects that emerge after manufacture while in the field) in the physical blocks of a particular bank that aren't attributable to any single hot logical region. This increase in host activity or decrease in the number of available physical blocks due to growing defects in a bank can also increase the wear on the remaining blocks in the bank related to the wear in other banks.

BRIEF SUMMARY

In order to address the problems and challenges noted above, a system and method is disclosed for reducing wear concentrations in flash memory by remapping logical address ranges associated with different memory banks.

According to a first aspect, a method for remapping storage of content between memory banks in a storage device is disclosed. The method may be performed in a storage device having a controller in communication with non-volatile memory, where the non-volatile memory comprises a plurality of memory banks and where each of the plurality of memory banks is associated with a respective unique range of logical block addresses. The controller detects a bank remapping review event. In response to detecting the bank remapping review event, the controller determines a difference in erase counts between a first memory bank having a highest erase count in the plurality of memory banks and a second memory bank having a lowest erase count in the plurality of memory banks. When the difference in erase counts exceeds a predetermined threshold, the controller remaps logical block addresses from a first range of logical block addresses associated with the first memory bank to a second range of logical block addresses associated with the second memory bank. The data associated with the remapped logical block addresses may be handled in several ways. In one embodiment the data associated with the remapped logical block addresses is already logically erased and so no physical copy of data is required. In another embodiment, although valid data may be associated with the remapped logical block addresses, instead of transferring the valid data the controller may wait until a subsequent host write command arrives and only then divert the data to the new bank that has had the logical block address assigned to it. In yet other embodiments, any valid data associated with the remapped logical block addresses is copied from the first memory bank to the second memory bank when the logical addresses are remapped. Each of these remapping embodiments may be used alone or in any combination with each other.

According to another aspect, a method for remapping storage of content between memory banks includes detecting a remapping review trigger relating to a total number of erase counts for the storage device, and determining if a difference in erase counts between a highest erase count bank and a lowest erase count bank exceeds a predetermined threshold. If the predetermined threshold is exceeded, logical addresses are remapped from the highest erase count bank to the lowest erase count bank. Additionally, when the difference between the second highest and second lowest erase counts in a third and fourth bank also exceeds a predetermined threshold, logical block addresses are mapped from the second highest erase count bank to the second lowest erase count bank.

In other aspects of the invention, a storage device is disclosed having multiple memory banks and a controller configured to execute the methods noted above. The storage device may include a bank routing table for maintaining logical block address ranges associated with each memory bank. Each memory bank may be associated with an internally or externally located group address table modified by the controller to include or remove the logical block addresses affected by the remapping process.

Other embodiments are disclosed, and each of the embodiments can be used alone or together in combination. The embodiments will now be described with reference to the attached drawings.

DETAILED DESCRIPTION

Figure 1:
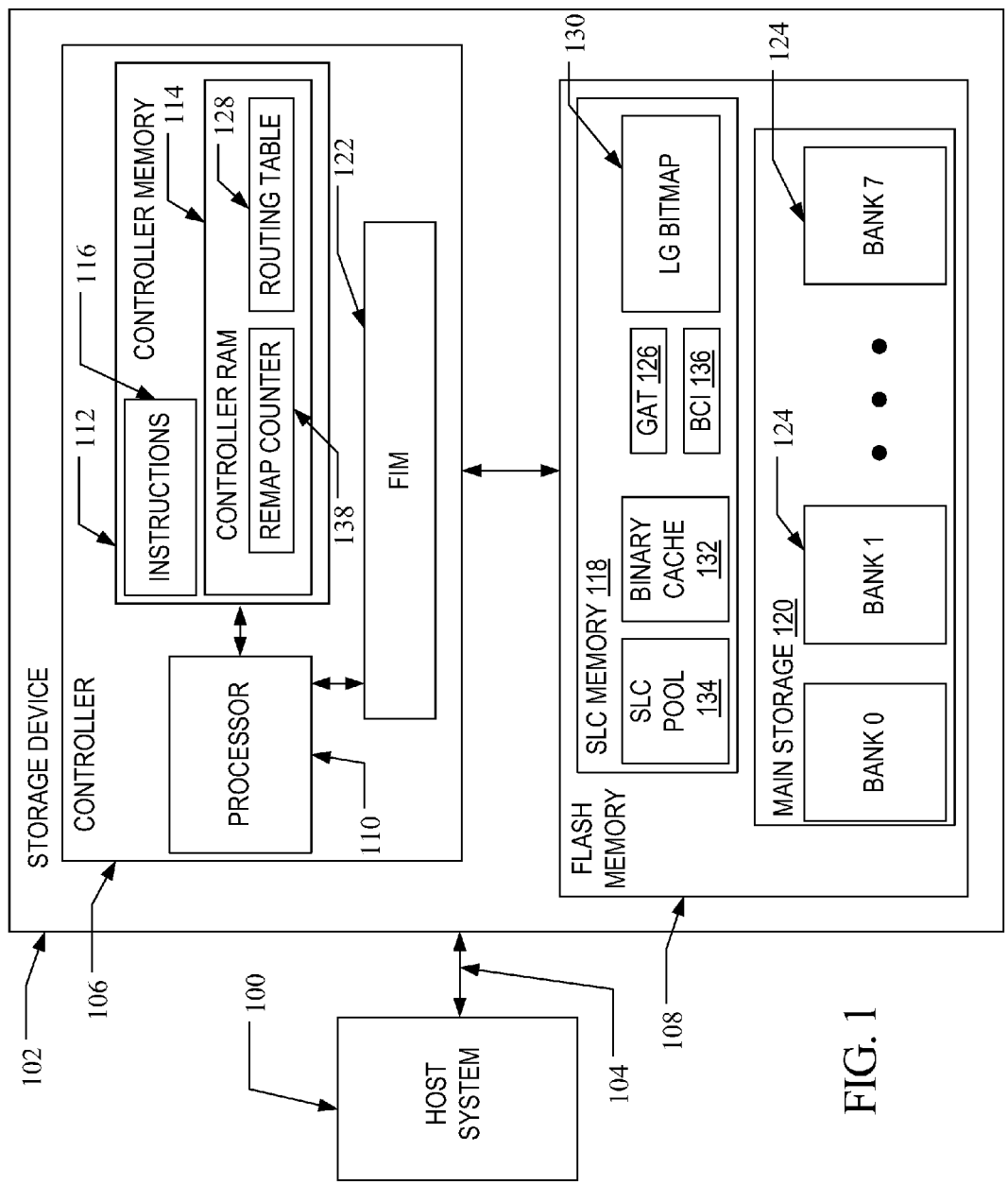
FIG. 1 illustrates a block diagram of a storage device and host according to one embodiment.

A flash memory system suitable for use in implementing aspects of the invention is shown in FIG. 1. A host system 100 stores data into, and retrieves data from, a storage device 102. The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data handling devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory, such as random access memory (RAM) 114, and/or non-volatile memory, and processor executable instructions 116 for handling memory management. A bank routing table 128 containing the logical addresses or address ranges associated with each specific memory bank may be stored in the controller memory 112, such as in controller RAM 114.

As discussed in more detail below, the storage device 102 may include functions for memory management. In operation, the processor 110 may execute memory management instructions (which may be resident in instructions 116) for operation of the memory management functions. The memory management functions may control the assignment of the one or more portions of the memory within storage device 102, such as controller memory 112. For example, memory management functions may allocate a portion of controller memory 112 for a data cache. One, some, or all of the memory management functions may be performed by one or separate elements within the storage device 102. The controller RAM 114 may include one or more data cache areas for use in optimizing write performance. The controller 106 may also include one of more flash interface modules (FIMs) 122 for communicating between the controller 106 and the flash memory 108. Additionally, the memory management instructions may include instructions for logically remapping data between memory banks in memory 108 as set forth below.

The flash memory 108 is non-volatile memory and may consist of one or more memory types. These memory types may include, without limitation, memory having a single level cell (SLC) type of flash configuration with one bit per cell capacity, also known as binary flash, and multi-level cell (MLC) type flash memory configuration having two or more bit per cell capacity. The flash memory 108 may be divided multiple parts, for example an SLC memory 118 and a main storage area 120 made up of MLC flash, where the main storage area 120 is further divided into multiple memory banks 124. Although the banks 124 are preferably the same size, in other embodiments they may have different sizes. The storage device 102 may be arranged to have a different FIM 122 designated for each bank 124 or more than one bank 124 associated with a FIM 122.

Figure 2:
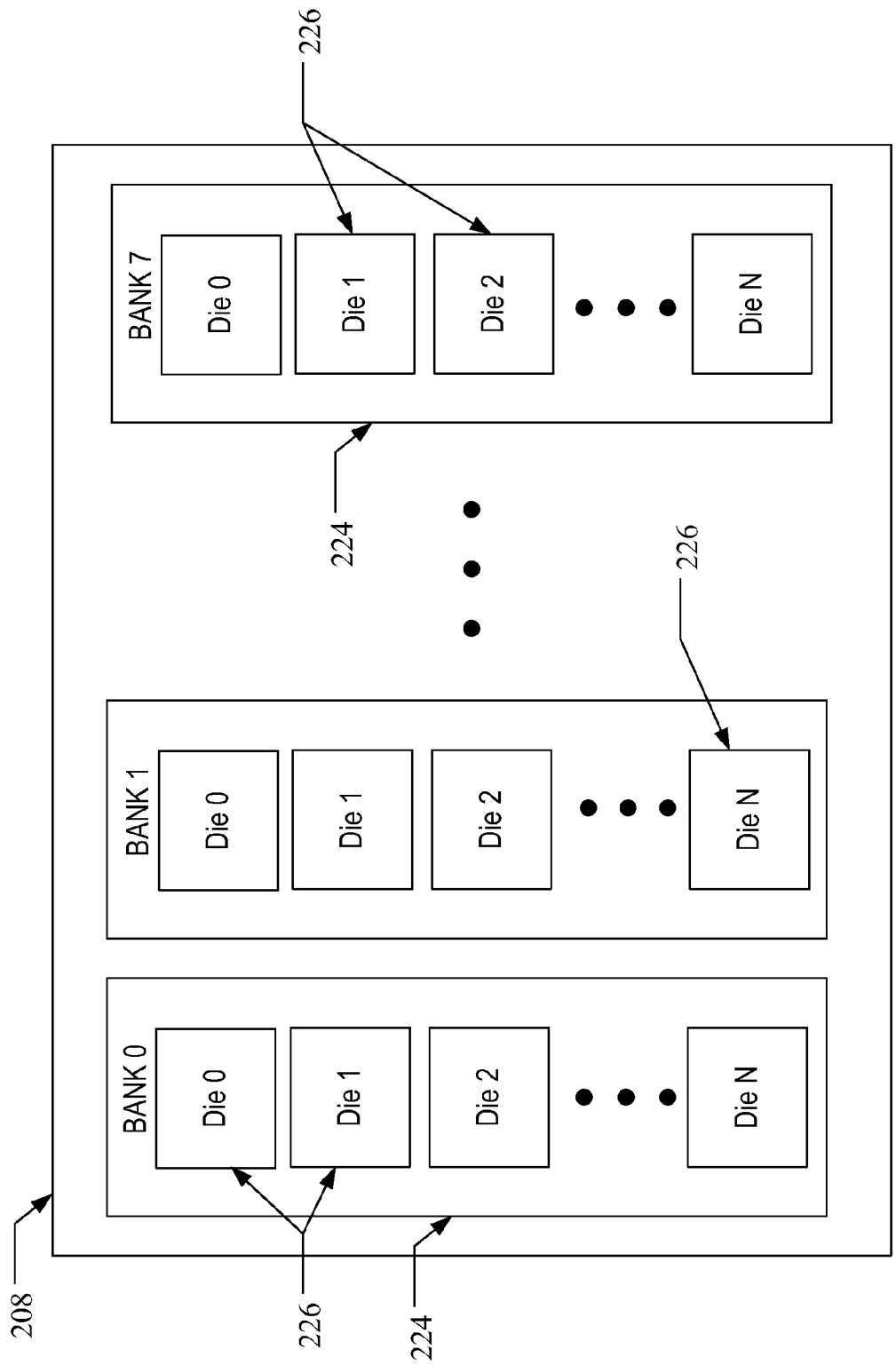
FIG. 2 is a block diagram of a flash memory configuration usable in the storage device of FIG. 1

Each bank 124 may include one or more separate integrated memory cell chips (referred to herein as die), and each die may have more than one plane of memory cells. As illustrated in FIG. 2, flash memory 208 of the storage device may include eight memory banks 224 and each of the banks 224 may include a plurality memory die 226. The number of banks and die illustrated in FIG. 2 is simply provided as an example. The number of banks 224 and/or die 226 per bank 224 may be different in other embodiments. Referring again to FIG. 1, the SLC memory 118 may contain a logical group bitmap 130 which may contain a list of valid and invalid logical groups of data stored in the flash memory 108, along with a group address table (GAT) 126 which may contain the physical location information of the logical groups. The GAT 126 and logical group bitmap 130 may be stored in the SLC Memory 118 or in another location in the storage device 102.

The SLC memory 118 may also maintain a binary cache 132, an SLC pool 134, a binary cache index (BCI) 136 and other data. The controller 106 may define the binary cache 132 and SLC pool 134 storage areas for use in handling a specific data content type, size and purpose. In one implementation, the controller 106 may use the binary cache 132 to store small fragments of clusters of data and the SLC pool 134 may be used to manage larger fragments of clusters and the binary working set (BWS) folding operations of data from SLC into MLC memory.

Figure 3:
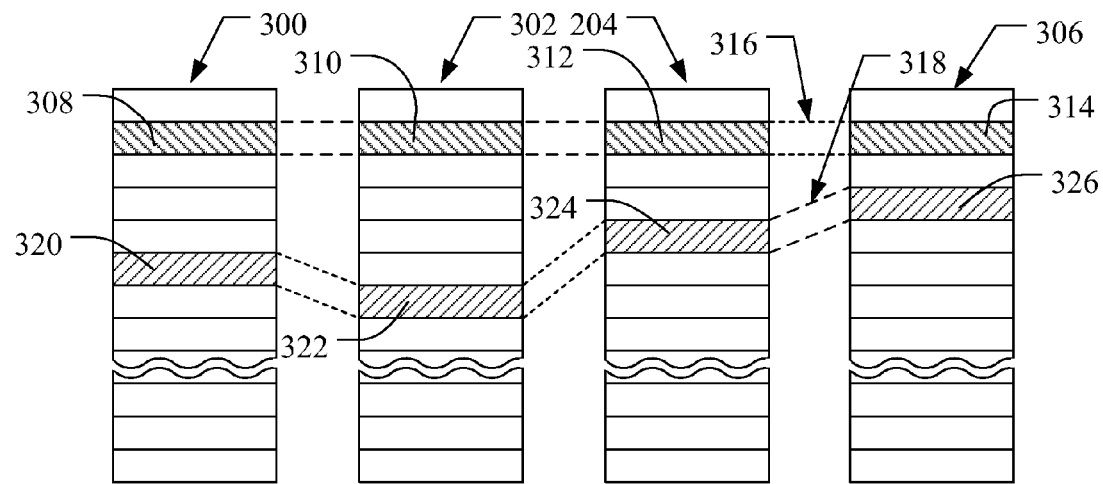
FIG. 3 illustrates an example physical memory organization of a memory bank of FIGS. 1-2.

Each bank 124 of the flash memory 108 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a bank 124 of a representative flash memory cell array is shown. Four planes or sub-arrays 300, 302, 304 and 306 of memory cells may be on a single die, on two die (two of the planes on each die) or on four separate die. The specific arrangement is not important to the discussion below and other numbers of planes may exist in a bank 124. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
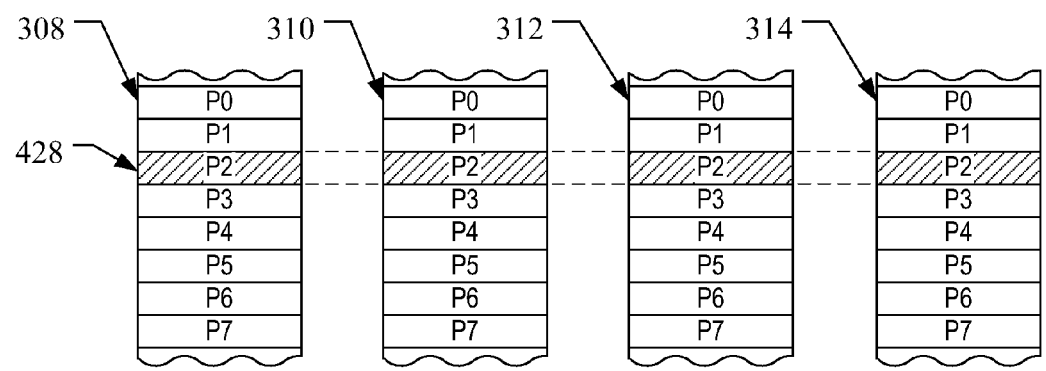
FIG. 4 shows an expanded view of a portion of the physical memory of FIG. 2.

The individual blocks are in turn divided for operational purposes into pages of memory cells, as illustrated in FIG. 4. The memory cells of each of blocks 308, 310, 312, and 314, for example, are each divided into eight pages P0-P7. Alternately, there may be 16, 32 or more pages of memory cells within each block. A page is the unit of data programming within a block, typically containing the minimum amount of data that are programmed at one time. The minimum unit of data that can be read at one time may be less than a page. A metapage 428 is illustrated in FIG. 4 as formed of one physical page for each of the four blocks 308, 310, 312 and 314. The metapage 428 includes the page P2 in each of the four blocks but the pages of a metapage need not necessarily have the same relative position within each of the blocks. A metapage may be the maximum unit of programming. The blocks disclosed in FIGS. 3-4 are referred to herein as physical blocks because they relate to groups of physical memory cells as discussed above.

As used herein, a metablock is a unit of address space defined to have a range of logical addresses the same size as one or more physical blocks. Each metablock includes one of more clusters of data, where a complete cluster is defined as containing a fixed number of multiple logical groups (LGs) and each LG includes a range of logical block address (LBAs)

that are associated with data received from a host 100. A logical group may refer to any of a number of logically contiguous related groups of data. It should be noted that a logical cluster is defined herein as some multiple of logical groups that may or may not be the same as the number of logical groups that could be stored within an MLC metablock (i.e., a physical metablock). A logical cluster may be smaller than, equal to, or larger than a size of a MLC metablock.

Figure 5:
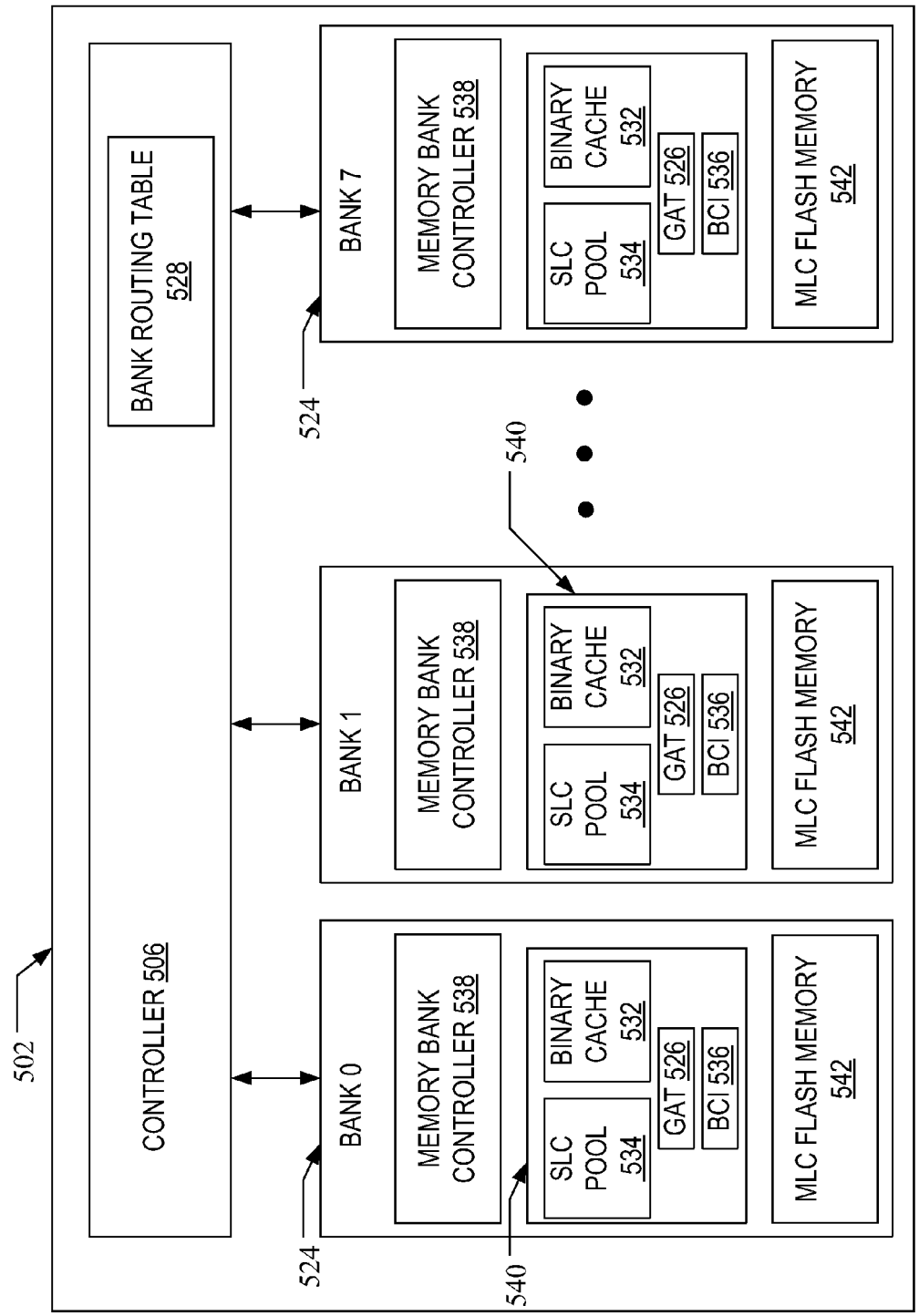
FIG. 5 shows an alternative block diagram of the storage device shown in FIG. 1.

Although in FIG. 1 the flash memory 108 is shown as including SLC memory 118 outside of the individual memory banks 124, in other implementations each bank 124 may instead include both SLC flash memory and MLC flash memory. For example, as illustrated in FIG. 5, each memory bank 524 of the storage device 506 would include in its SLC memory 540 a portion of the GAT 526 relevant to that bank 524. Additionally, each bank 524 may include its own SLC pool 534, Binary Cache 532, and Binary Cache Index (BCI) 536 in one implementation. In other implementations, in combination with or separate from the combined MLC and SLC memories (542, 540) in each bank 524, each memory bank 524 may have its own controller 538 that is separate from the storage device controller 506. The storage device controller 506 may be configured to store and manage logical block address routing tasks (e.g. tracking and routing logical block addresses associated with specific banks) and other device level tasks, while the bank controllers 538 may manage storage tasks within the particular memory bank 524.

Utilizing any of the multi-bank storage device architectures disclosed above, a method of controlling wear is discussed below. As set forth in greater detail below, in order to achieve a greater level of memory wear control, a method of managing the memory of a storage device increases the logical data range assigned to a "cold" memory bank and decreases the logical data range assigned to a "hot" memory bank, where the cold memory bank is a memory bank having a lower erase count than the hot memory bank. This method may be executed a limited number of times during the expected life of the storage device and implemented based on hardware, firmware or software, for example processor executable instructions maintained in controller memory 112 or elsewhere, in the storage device 102, 502.

Many flash storage devices maintain erase counts, also referred to as hot counts, for each block in the storage device. Additionally, a storage device may maintain or calculate an average hot count for certain blocks within the entire pool of blocks managed by the storage device. For example, each memory bank in the storage device may maintain an average hot count for SLC blocks within the SLC memory of a memory bank and a separate average hot count for MLC blocks within that same memory bank. By checking the average hot counts among banks, it is possible to detect a skew in the hot counts. The skew being the difference between the hot counts of banks, for example the difference between the hot count of the highest erase count bank and the hot count of the lowest erase count bank. If a skew in the MLC hot counts is found such that the hot count in a first bank is significantly higher than at least one other bank, then, in one embodiment, data of a fixed logical block address data range assigned to the bank with the highest erase count may be remapped to the logical block address data range assigned to a different bank.

Figure 6:
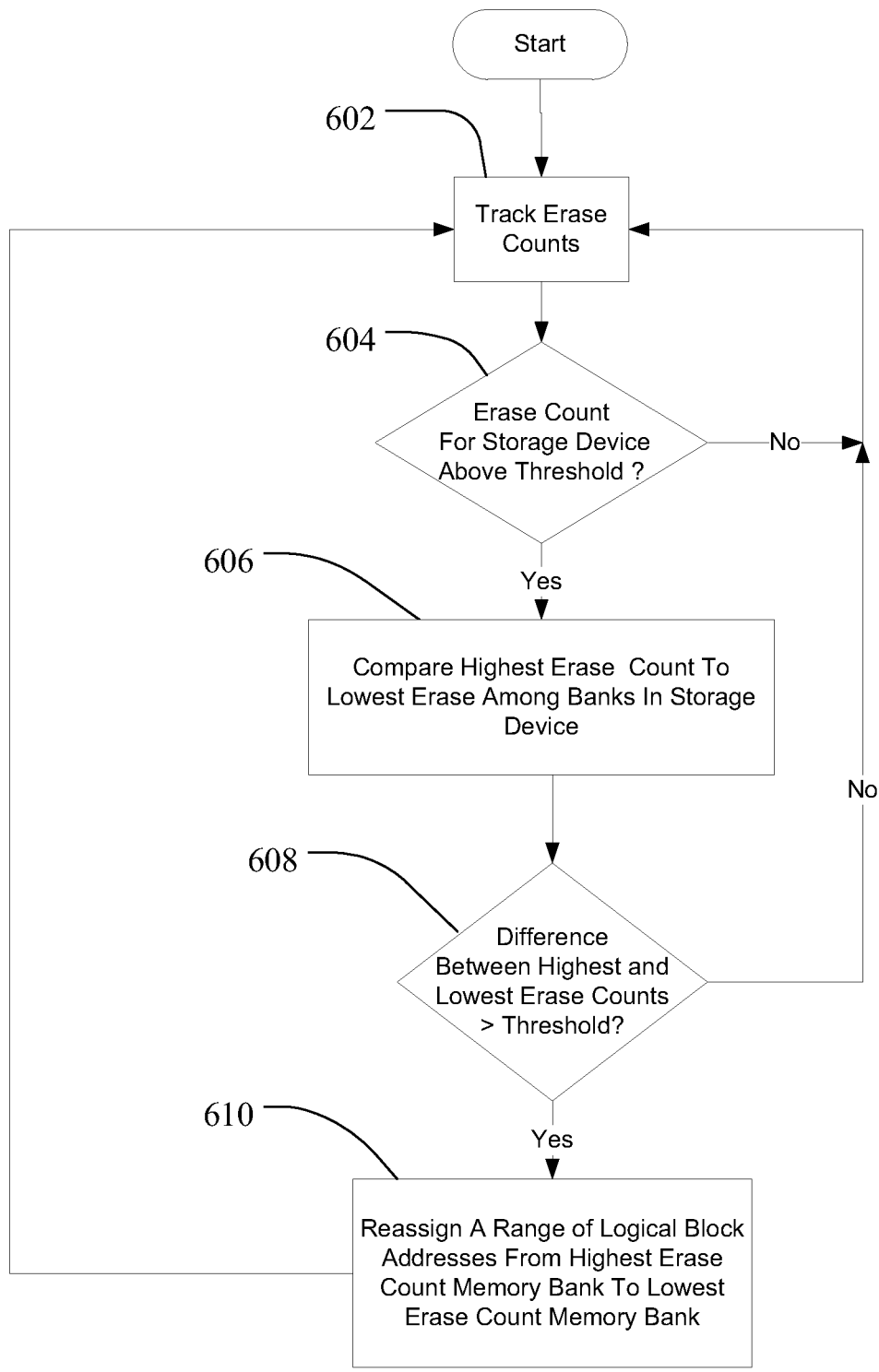
FIG. 6 is a flow chart of one method of remapping data from one memory bank to another to balance wear.

Referring to FIG. 6, the controller for each bank 124, 524 tracks the erase count within that bank 124, 524 (at 602). Erase count tracking may be for all blocks in the bank regardless of the type of memory (e.g. SLC or MLC memory cells), or may be a separate erase count for each different type of memory cell in the memory bank. If a remapping review event occurs, such as when the total erase count for the storage device 102, 502 is greater than a set threshold, then the controller initiates a remapping review. In the remapping review, the highest erase count bank is compared by the controller 106, 506 to the lowest erase count bank and a difference is determined in erase counts (at 604, 606 and 608). If the difference between the erase count in the highest erase count bank and the lowest erase count bank is greater than a skew threshold value, then the controller 106, 506 in the storage device 102, 502 which routes the incoming data to the various banks 124, 524 according to predetermined logical block address ranges, will remap logical data addresses between the banks by reassigning a range of logical block addresses from the highest erase count memory bank to the lowest erase count memory bank (at 610). The skew threshold value may be a percentage difference between highest and lowest erase count banks, for example a 5% difference, or may be an absolute number of erase counts difference between the highest and lowest erase count banks. Other skew thresholds and skew threshold calculation algorithms are also contemplated. Alternatively, referring again to FIG. 6, if there isn't a significant enough difference between the highest erase count bank and the lowest erase count bank to meet the threshold then the controller 106, 506 may reset the initial storage device threshold count and keep track of total erase counts until the next remapping review event occurs, which may be when the next multiple of the storage device erase count threshold is reached. The amount of remapped data may be fixed to a predetermined amount or may be dynamically determined based on factors such as the magnitude of the erase count skew beyond the skew threshold.

In one embodiment, the reassignment of a range of logical block addresses from the highest erase count memory bank to the lowest erase count memory bank is simply limited to the highest and lowest erase count banks regardless of how many banks are in the system. Each of the limited number of times during the life of the storage device when a remapping review event is reached, different memory banks may be determined to have the highest erase count or the lowest erase count, however data is only remapped from the single highest erase count bank to the single lowest erase count bank at the time of the remapping review. In other embodiments, the highest and lowest erase count banks may be compared to find the difference in erase counts and, if the threshold difference has been reached, logical addresses associated with the highest count memory bank moved to the lowest erase count memory bank, and then the second highest erase count memory bank will be compared with the second lowest erase count memory bank to again see if a threshold difference has been reached. In this alternative embodiment, the remapping process may be extended to a next highest erase count memory bank and a next lowest erase count memory bank, and so on, for further remapping of logical data.

Figure 7:
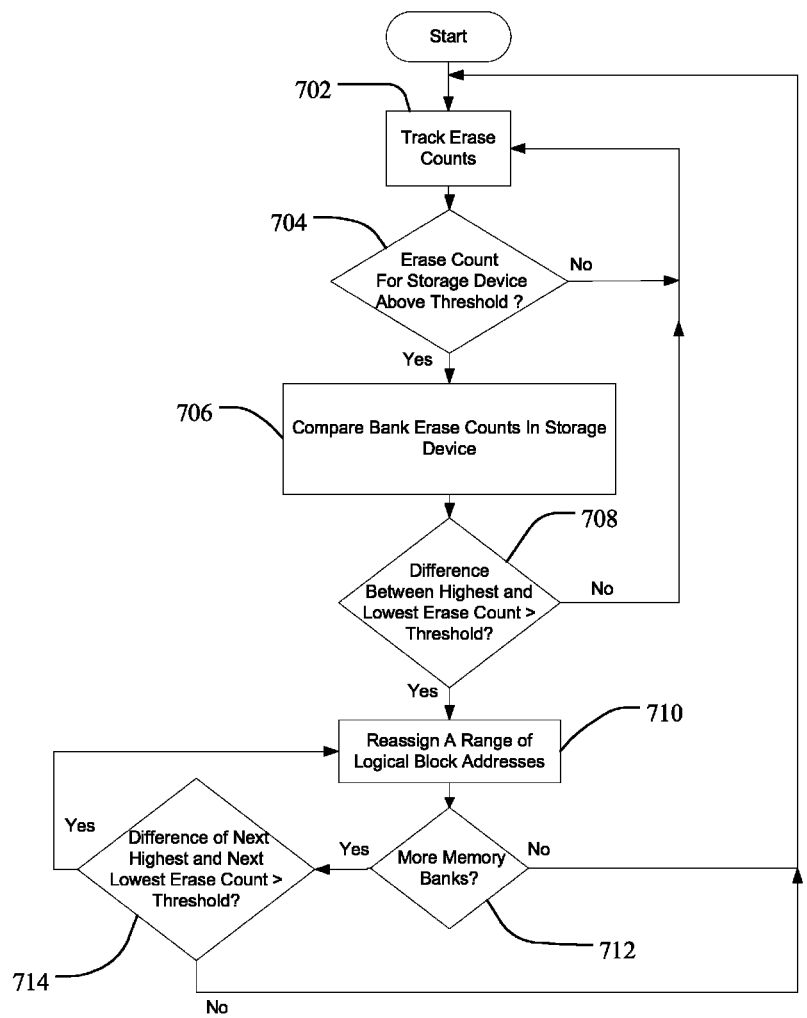
FIG. 7 is a flow chart of an alternative embodiment of the method of FIG. 7.

This alternative embodiment is illustrated in FIG. 7, the same general process of tracking erase counts, checking to see if an erase count threshold for the device has been reached and comparing erase counts as in FIG. 6 is done (at 702, 704 and 706), but the skew thresholds are checked against not only the highest and lowest erase count banks, but against one or more next highest and next lowest erase count bank pairings (at 712, 714). In the embodiment of FIG. 7, if the threshold has also been reached between the second highest and second lowest erase count memory banks then logical block addresses from the second highest erase count memory bank are moved to the second lowest erase count memory bank, and so on. The skew threshold for erase counts may be the same for both highest and lowest, and second highest and second lowest, hot count banks. Alternatively, the skew thresholds for triggering a remapping may differ between the highest and lowest and next highest and next lowest banks, and so on. The remapping in the implementation of FIG. 7 may be limited to remapping of data between the highest and lowest, and between next highest and next lowest. In other implementations, the remapping for the embodiment of FIG. 7 may be implemented such that remapping may be between a higher erase count bank to more than one lower erase count bank. The amount of remapped data may be identical for each or may differ based on factors such as the magnitude of the erase count skew beyond the particular skew threshold for the memory banks being compared.

When the difference between the highest and lowest erase count memory banks, and the difference between the next highest and next lowest erase count memory banks in other embodiments, is at or above the associated threshold the remapping of logical data requires the reduction in the total logical block address range for the higher erase count memory bank and an increase in the logical block data range for the lower erase count memory bank. Remapping of the logical data will require that the latest valid copy of the data associated with the logical addresses being reassigned be copied from the higher erase count memory bank to the lower erase count memory bank. Additionally, the controller 106, 506 will adjust its routing table 128, 528 so that the logical block address range for the higher erase count memory bank is now exclusively associated with the lower erase count memory bank such that future data in that logical block address range will be routed to the lower erase count memory bank.

Regardless of whether the remapping is limited to the highest and lowest erase count memory banks as in FIG. 6, or is performed between multiple sets of memory banks as in FIG. 7, the total number of used logical block addresses is increased in the lower erase count memory bank and is decreased in the higher erase count memory bank. Although any amount of logical addresses may be remapped, in one embodiment, the logical block address range to be remapped between banks may be limited to 1-2% percent of the physical memory capacity of the bank. In some implementations, the logical block address remapping may be for a fixed amount of logical addresses regardless of magnitude of the determined erase count skew. In other implementations, the logical address range to be remapped may vary from a minimum amount up to a fixed maximum range based on an amount that the determined erase count skew is above the skew threshold.

In order to allow a portion of the originally assigned logical block address range for the higher erase count memory bank to be moved, the lower erase count memory bank is preferably overprovisioned so that it has unused physical space that can be logically addressed. Overprovisioning of the physical storage space in a bank or die is standard practice in the manufacture of flash memory devices to provide an adequate supply of spare blocks should defects be acquired within a bank. A portion of this overprovisioned supply of physical blocks may be used in the remapping process. Assuming that each bank has a 3-5 percent overprovisioning of physical storage space, in one embodiment the amount of data to be remapped would be 1-2 percent of the total data in the bank such that a sufficient supply of unallocated blocks is available as spare blocks for the receiving bank (i.e., the coldest bank).

Similarly, there is typically some overprovisioning in the data structures at format time for the memory in each memory bank to reference these extra physical addresses. This may include extra GAT (group address table) pages in the GAT 126, 526 at format time. In some systems this overprovisioning of the data structures to record the data locations for overprovisioned data assigned to a memory bank may be relatively simple, for example in a system which only maintains GAT pages that reference at least one valid logical group (LG) the GAT pages can be left unused and created only when the remapping requires them. Thus, the GAT or other mapping table structure in a memory bank may include used logical address capacity corresponding to the designated physical capacity of the memory bank, in addition to unused logical address capacity (overprovisioned logical table space) that may be used to receive remapped logical addresses up to the amount of overprovisioned physical storage space (e.g. the 1-2% extra physical storage space beyond the designated physical storage space of the memory bank).

The remapped range or contiguous and/or discontiguous logical addresses from the highest erase count memory bank may then be added to the end of the GAT or other data structure in the lowest erase count memory bank increasing the total amount of logical address space used in the lowest erase count memory bank. Although the remapping could alternatively involve a swap of logical addresses between highest and lowest erase count banks, where hot data is moved to the cold bank and cold data moved to the hot bank with a net constant amount of logical address space in each bank, the remapping discussed herein is preferably a one-way move from hottest bank to coldest bank where there is a gain of total logical address range handled by the coldest bank and a loos of total logical address range handled by the hottest bank after the remapping.

Referring again to FIG. 6, the address range selected by the controller for remapping from the memory bank 124, 524 with the highest erase count (see step 620) may be a contiguous or discontiguous range of logical block addresses. In one embodiment, the controller 106 (or controllers 506, 538) may select the range of logical addresses based on a set of selection criteria or a priority listing. For example, the range of addresses may be selected based on the type of data that may require the least amount of time to transfer, or selected based on the most active data such wear due to erase cycles may be more effectively spread out. With respect to prioritizing selection of data from the hottest bank that requires the least overhead or processing time, logically erased data, such as data subject to a TRIM command, may be given highest priority for remapping by the controller.

A TRIM (or a logical erase) command is a command that a host can issue to a storage device informing the storage device that certain data in sets of logical ranges are not required by the host operating system. Data in these identified ranges can then be discarded by the storage device 102, 502 if it is advantageous to do so. Thus, where the controller 106, 506 of the storage device 102, 502 knows that certain logical block addresses are no longer associated with valid data due to information from a TRIM command, those logical address (or address ranges) it may prioritize those addresses for re-mapping. When selecting a range of data to be moved from the determined hot bank to the determined coldest bank, an initial preference for selecting the data to be moved may be to select TRIM'd data. The TRIM'd data, because it relates to a range of addresses for information that the host wishes to delete but that has not been physically deleted, allows the controller to, in the process of FIG. 6, remap the logical addresses from the hottest bank to the coldest bank without the actual need to follow with a copy operation to move valid data from the physical storage space of the highest erase count bank to the physical storage space of the lowest erase count bank. The data is no longer valid and so the logical addresses may be remapped to the destination bank (e.g. the lowest erase count bank) and no data corresponding to the logical addresses need be moved, saving time and resources as compared to a remapping of logical addresses corresponding to valid data that must be copied to the new bank.

After a preference for using TRIM'd data available in the hottest bank, the next preferred data type to move is data that has a highest frequency write statistic. The highest frequency write statistic may either be most recently written data, or data that have a logical address range indicative of frequent erase cycles over an extended period of time. For example, in one embodiment the controller of the memory may track the last N (N being some predetermined integer number) commands and if a particular logical block address (LBA) has been written in the last N commands then the controller may consider it a "hot" LBA and route it to a dedicated hot update block. In this embodiment, when the above-noted threshold for triggering an actual re-mapping is reached, the controller may simply choose some data from the current hot update block and add those LBA addresses to the address range of the coldest bank while removing those LBA addresses from the address range associated with the hottest bank. Following the preferences for using TRIM'd or high frequency write statistic data, any data in the hottest bank may be moved, up to the amount of data that is to be moved from the hottest bank to the coldest bank.

In addition to reassigning a logical range of TRIM'd (logically erased) data where no physical copy of associated data is necessary, and/or reassigning a logical address range where the associated valid data is physically copied from the hottest to the coldest bank, another version of remapping is contemplated. In this additional version of remapping, the logical block address range selected for remapping may be remapped to the coldest memory bank as described in FIG. 6 but, rather than also copying any valid data associated with the remapped logical range to the new bank, the controller will wait until a next host write command comes in with data for that remapped range and divert the data to the bank having the remapped logical address range. In this manner, the time and resources of a concurrent copy operation for valid data can be avoided. Depending on the selected logical block address range for remapping, one or more of the data remapping procedures noted above may be used alone or in combination.

As part of the remapping process, the group address table (GAT) 126, 526 that tracks the logical to physical mapping in each of the banks 124, 524 is updated by the controller 106 or controllers 506, 538 so that GAT entries associated originally with the hottest bank which have been remapped, are now exclusively associated with the coldest bank. In one implementation, as shown in FIG. 1, the GAT 126 for all the memory banks 124 may be located outside the memory banks 124. Alternatively, each memory bank 524 may have its own distinct GAT 526 as illustrated in FIG. 5. As noted above, the storage device 102, 502 may be formatted such that each GAT or other mapping table for each bank has some extra unused logical capacity.

Figure 8:
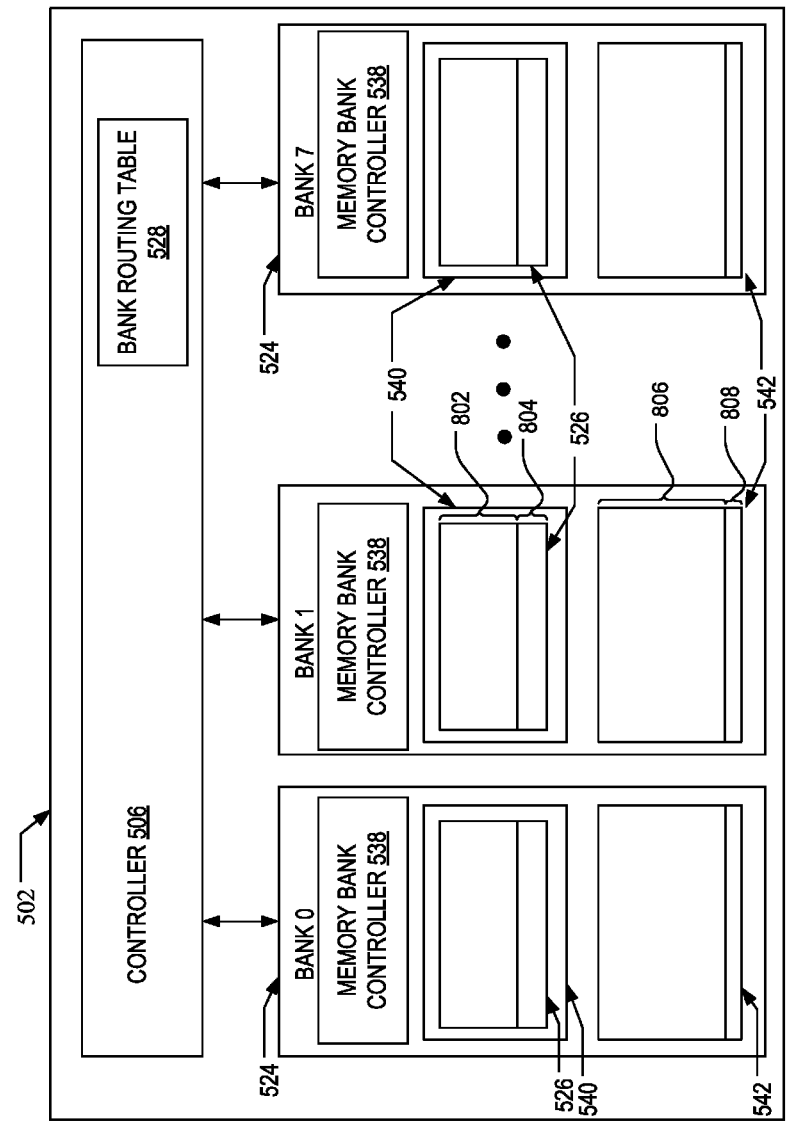
FIG. 8 is a simplified view of the block diagram of FIG. 5 illustrating the overcapacity in the logical mapping data structures and physical storage space in each bank of the multi-bank storage device.

Referring to FIG. 8, a simplified version of the storage device 502 of FIG. 5 is shown to illustrate the concept of unused GAT capacity and overprovisioned physical capacity. The SLC flash memory 540 in each bank 524 may include a GAT 526 or other mapping structure with an allocated LBA range 802 and a pre-allocated overprovisioned and unused range 804. Similarly, the MLC flash memory area 542 may include a designated used physical capacity 806 and overprovisioned unused capacity 808. The pre-allocated unused GAT capacity 804 is TRIM'd by default and takes no space unless later used. Accordingly, if data is remapped from Bank 0 to Bank 7, the controller 506 translates LBA range X in the Bank 0 to LBA range Y in Bank 7 where LBA range Y is located inside the pre-allocated unused space 804 in Bank 7 (for this example it is assumed that Bank 7 is the coldest bank and Bank 0 the hottest in the last remapping review and that the skew threshold had been reached or exceeded). For example, if LBA range X being remapped from Bank 0 includes logical block addresses A through A+n from within the allocated LBA range 802 of Bank 0, it may be added at the end of the allocated LBA range 802 in Bank7. Thus if the maximum logical block address allocated in Bank 7 is Ymax, then the remapped logical block address range would be placed in the previously unused GAT space 804 of Bank7 from Ymax through Ymax+n.

In addition to expanding the GAT entries for the coldest bank which is receiving the remapped data and reducing the GAT entries for the hottest bank which is giving up the data, the controller 106, 506 for the storage device updates the bank routing table 128, 528 for logical block addresses indicate that the data in the remapped logical address ranges is now to be directed to, or looked for in, the bank determined to be the coldest bank during the remapping process rather than the hottest bank where that same data range was mapped prior to the remapping process.

The various implementations of remapping data from one bank to another noted above may be triggered only a few times during the entire life of the storage device. For example, it may be desired only to make adjustments to remap hot spot data, or data from banks which have accumulated a large number of erase cycles due to acquired defects, four or fewer times during the expected life of the storage device. As another example, if the storage device has eight banks and it is a SATA-type device where there is often one very "hot" group of data, the controller 106, 506 may be configured to divide the expected life cycle of the device into seven bank remapping review event periods. Thus, in this embodiment there will be seven times where the controller will compare the highest and lowest erase count banks and trigger remapping if the threshold skew requirement is met. Assuming the threshold skew is met at each of the seven remapping review events, and that there is one hot range of addresses, the hot range of addresses may potentially be remapped to reside in each of the banks over the life of the storage device.

To accomplish the desired frequency of triggering the remapping review process noted above, a remap counter 138 that tracks a total erase count for the memory device 102 may be set such that the threshold for triggering the remapping process only occurs at a desired fraction of the expected life of the storage device. To avoid a "thrashing" effect, where the controller 106 engages in a remapping check and moves the data too frequently, a marker or counter reset may be implemented. The marker or counter reset may be set after each time a trigger has led to a review of whether remapping is necessary. For example, when the storage device reaches the total erase count threshold for the memory (or the erase count for the type of memory within the storage device that is being used to track erase cycles) and has gone through a check to determine whether remapping is necessary, the counter 138 may be reset to zero and can accumulate the next threshold number of erase counts for the next trigger event.

Alternatively, instead of resetting the remap counter 138, the remap counter 138 may be a continuously incrementing counter that also includes a flag that is set after each time a remapping threshold has been reached and a check made to see if the skew threshold has been reached. The flag may be used by the controller to determine the multiple of the number of total erase counts the counter is continually tracking that qualifies for triggering the next remapping review. Other remapping trigger mechanisms are contemplated.

A method and system remapping logical data between memory banks of a storage device has been disclosed where, for a limited number of times during the life of a storage device, a determination of whether remapping logical data from a highest erase count memory bank to a lowest erase count memory bank is made. When the threshold difference, or skew, in erase counts between the highest erase count and lowest erase count memory banks is at or above a predetermined threshold, a limited amount of logical block addresses are remapped from the highest erase count memory bank to the lowest erase count memory bank to even out error between the banks. A result of a remapping is that the lowest erase count memory bank needs to manage more data but the highest erase count memory bank now has to manage less data and so can spread the valid logical data more thinly, which in turn leads to less maintenance and should reduce wear on the highest erase count bank. The counter or flag and counter arrangement may be used to limit the total number of times a remapping determination is made during the life of the storage device, so that the remapping determination and process will only be done at certain times when the average erase count of the desired type of memory in the memory banks reaches the next predetermined level.

The method and system described above for re-mapping data between memory banks to reduce hot spot wear may be implemented on a removable or standalone storage device or memory embedded in a host. Techniques for implementing a bank wear balancing method, that is triggered at only a few points in the life of a multi-bank memory have been described. Although remapping of logical address ranges from only the hottest bank to the coldest bank is contemplated in one embodiment, remapping between more than one pair of banks, or from one bank to multiple destination banks may be accomplished in different embodiments. The disclosed remapping process may run as a background process, when no host commands are pending, to avoid interfering with higher priority storage device functions The controller may select data to transfer based on a hierarchy of data types or other criteria, and the amount of data to be remapped may be limited to a portion of the overprovisioned physical capacity available in the memory bank to which the additional logical block address range is to be added. The erase count tracking, comparison, logical address range selection and remapping tasks that make up the disclosed multi-bank storage device logical address remapping functions may be implemented in hardware, or as software or firmware executable by a processor of the storage device.

An advantage of the disclosed method and system is that uneven wear may be reduced to provide a potentially longer operating life to a storage device. Logical address ranges exclusively assigned to a specific bank may be decreased in one of more banks where hot spots or growing defects have led to an increased number of block erases and remapped to one or more colder memory banks such that the total logical block address range for data handled by the colder block is increased and the total logical block address range associated with the hotter block is decreased. This rebalancing of data responsibility can assist in avoiding uneven wear and premature failure of a multi-bank storage device.

It is intended that the foregoing detailed description be regarded as illustrative rather than limiting, and that it be understood that it is the following claims, including all equivalents, that are intended to define the spirit and scope of this invention.

What is claimed is:

1. A method of remapping storage of content between memory banks in a storage device, the method comprising:
   in a storage device having a controller in communication with non-volatile memory, wherein the non-volatile memory comprises a plurality of memory banks and wherein each of the plurality of memory banks is associated with a respective unique range of logical block addresses, the controller:
   detecting a bank remapping review event, wherein detecting the bank remapping review event comprises determining a total erase count for only multi-level cell (MLC) flash memory cells in the plurality of memory banks exceeds a predetermined storage device erase count;
   in response to detecting the bank remapping review event, determining a difference in erase counts between a first memory bank having a highest erase count in the plurality of memory banks and a second memory bank having a lowest erase count in the plurality of memory banks; and
   when the difference in erase counts exceeds a predetermined threshold, remapping logical block addresses from a first range of logical block addresses associated with the first memory bank to a second range of logical block addresses associated with the second memory bank.

2. The method of claim 1, further comprising copying any valid data associated with the remapped logical block addresses from the first memory bank to the second memory bank.

3. A method of remapping storage of content between memory banks in a storage device, the method comprising:
   in a storage device having a controller in communication with non-volatile memory, wherein the non-volatile memory comprises a plurality of memory banks and wherein each of the plurality of memory banks is associated with a respective unique range of logical block addresses, the controller:
   detecting a bank remapping review event;
   in response to detecting the bank remapping review event, determining a difference in erase counts between a first memory bank having a highest erase count in the plurality of memory banks and a second memory bank having a lowest erase count in the plurality of memory banks; and
   when the difference in erase counts exceeds a predetermined threshold, remapping logical block addresses from a first range of logical block addresses associated with the first memory bank to a second range of logical block addresses associated with the second memory bank; and
   wherein remapping logical block addresses comprises the controller of the storage device selecting a range of logical block addresses associated with the first memory bank and changing an association of the selected range of logical block addresses from the first memory bank to the second memory bank such that a total logical block address range associated with the first memory bank is reduced and a total logical block address range associated with the second memory bank is increased.

4. The method of claim 3, wherein the controller first selects any logical block addresses from the first memory bank associated with logically erased data when selecting the range of logical block addresses, wherein logically erased data comprises data marked as obsolete prior to physical erase.

5. The method of claim 3, wherein the controller selects logical block addresses for data most recently written to the first memory bank for the range of logical block addresses.

6. The method of claim 3, wherein the controller selects logical block addresses associated with valid data and associates the selected logical block addresses to the second memory bank without copying the valid data from the first memory bank to the second memory bank, wherein the controller diverts data associated with the selected logical block addresses that is received in a subsequent host write command to the second memory bank.

7. The method of claim 3, further comprising the controller updating an address table in the first memory bank to remove the range of logical block addresses, and updating an address table of the second memory bank to add the range of logical block addresses, wherein a total amount of used logical addresses associated with the first memory bank is reduced and a total amount of used logical block addresses associated with the second memory bank is increased.

8. The method of claim 1, wherein the predetermined threshold between the highest erase count and the lowest erase count of the plurality of memory banks comprises at least a five percent difference between the highest erase count and the lowest erase count.

9. A storage device comprising:
a non-volatile memory having a plurality of memory banks and wherein each of the plurality of memory banks is associated with a respective unique range of logical block addresses; and
a controller in communication with the plurality of memory banks, the controller configured to:
detect a bank remapping review event, wherein the controller is configured to detect the bank remapping review event when a total erase count for only multi-level cell (MLC) flash memory cells in the plurality of memory banks exceeds a predetermined storage device erase count;
in response to detecting the bank remapping review event, determine a difference in erase counts between a first memory bank having a highest erase count in the plurality of memory banks and a second memory bank having a lowest erase count in the plurality of memory banks; and
when the difference between the highest and lowest erase counts exceeds a predetermined threshold:
remap logical block addresses from a first range of logical block addresses associated with the first memory bank to a second range of logical block addresses associated with the second memory bank.

10. The storage device of claim 9, wherein the controller is further configured to copy any valid data associated with the remapped logical block addresses from the first memory bank to the second memory bank.

11. The storage device of claim 9, wherein to remap logical block addresses the controller of the storage device is configured to select a range of logical block addresses associated with the first memory bank and change an association of the selected range of logical block addresses from the first memory bank to the second memory bank.

12. The storage device of claim 11, wherein the controller is configured to first select any logical block addresses associated with trimmed data from the first memory bank when selecting the range of logical block addresses, wherein trimmed data comprises data marked as obsolete prior to erase.

13. The storage device of claim 11, wherein the controller is configured to select logical block addresses for data most recently written to the first memory bank for the range of logical block addresses.

14. A storage device comprising:
a non-volatile memory having a plurality of memory banks and wherein each of the plurality of memory banks is associated with a respective unique range of logical block addresses; and
a controller in communication with the plurality of memory banks, the controller configured to:
detect a bank remapping review event;
in response to detecting the bank remapping review event, determine a difference in erase counts between a first memory bank having a highest erase count in the plurality of memory banks and a second memory bank having a lowest erase count in the plurality of memory banks; and
when the difference between the highest and lowest erase counts exceeds a predetermined threshold:
remap logical block addresses from a first range of logical block addresses associated with the first memory bank to a second range of logical block addresses associated with the second memory bank, wherein to remap logical block addresses the controller of the storage device is configured to select a range of logical block addresses associated with the first memory bank and change an association of the selected range of logical block addresses from the first memory bank to the second memory bank; and
wherein the controller is configured to select logical block addresses associated with valid data and associate the selected logical block addresses to the second memory bank without copying the valid data from the first memory bank to the second memory bank, wherein the controller is configured to divert data associated with the selected logical block addresses received in a subsequent host write command to the second memory bank.

15. The storage device of claim 11, wherein the controller is further configured to update an address table of the first memory bank to remove the range of logical block addresses, and update an address table of the second memory bank to add the range of logical block addresses, wherein a total amount of used logical addresses associated with the first memory bank is reduced and a total amount of used logical block addresses associated with the second memory bank is increased.

16. The storage device of claim 15, wherein the address table of the first memory bank is in the first memory bank and wherein the address table of the second memory bank is in the second memory bank.

17. The storage device of claim 11, wherein the predetermined threshold between the highest erase count and the lowest erase count of the plurality of memory banks comprises a five percent difference between the highest erase count and the lowest erase count.

18. A storage device comprising:
a non-volatile memory having a plurality of memory banks and wherein each of the plurality of memory banks is associated with a respective unique range of logical block addresses; and
a controller in communication with the plurality of memory banks, the controller configured to:
detect a bank remapping review event;

in response to detecting the bank remapping review event, determine a difference in erase counts between a first memory bank having a highest erase count in the plurality of memory banks and a second memory bank having a lowest erase count in the plurality of memory banks; and when the difference between the highest and lowest erase counts exceeds a first predetermined threshold:
  remap logical block addresses from a first range of logical block addresses associated with the first memory bank to a second range of logical block addresses associated with the second memory bank;

in response to detecting the bank remapping review event, determine a difference in erase counts between a third memory bank having a second highest erase count in the plurality of memory banks and a fourth memory bank having a second lowest erase count in the plurality of memory banks; and when the difference between the second highest and second lowest erase counts exceeds a second predetermined threshold:
  remap logical block addresses from a third range of logical block addresses associated with the third memory bank to a fourth range of logical block addresses associated with the fourth memory bank.

19. The storage device of claim 18, wherein the controller is configured to remap an amount of logical block addresses from the first memory bank to the second memory bank by updating a bank routing table maintained in the storage device to reduce a range of logical block addresses associated with the first memory bank and to increase the range of logical block addresses associated with the second memory bank.

* * * * *